US012632367B2

(12) United States Patent
Surya et al.

(10) Patent No.: US 12,632,367 B2
(45) Date of Patent: May 19, 2026

(54) HARDWARE RELIABILITY DIAGNOSTICS AND FAILURE DETECTION VIA PARALLEL SOFTWARE COMPUTATION AND COMPARE

(71) Applicant: Intel Corporation, Santa Clara, CA (US)

(72) Inventors: Krishna Surya, Portland, OR (US); William L. Hines, Lincoln, CA (US)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 17/175,488

(22) Filed: Feb. 12, 2021

(65) Prior Publication Data

US 2021/0165730 A1     Jun. 3, 2021

(51) Int. Cl.
| | |
|---|---|
| *G06F 9/445* | (2018.01) |
| *G06F 11/07* | (2006.01) |
| *G06F 11/32* | (2006.01) |
| *G06F 11/34* | (2006.01) |
| *G06F 11/3668* | (2025.01) |

(52) U.S. Cl.
CPC ...... *G06F 11/3688* (2013.01); *G06F 11/0772* (2013.01); *G06F 11/328* (2013.01); *G06F 11/3414* (2013.01); *G06F 11/3692* (2013.01)

(58) Field of Classification Search
CPC ............. G06F 11/3688; G06F 11/0772; G06F 11/328; G06F 11/3414; G06F 11/3692
USPC ................................................. 717/124–127
See application file for complete search history.

(56) References Cited

U.S. PATENT DOCUMENTS

2021/0097641 A1* 4/2021 Iyer ...................... A63F 13/355

FOREIGN PATENT DOCUMENTS

KR        20210038294 A  *  4/2021  ........... G06F 9/4881

* cited by examiner

*Primary Examiner* — Chuck O Kendall
(74) *Attorney, Agent, or Firm* — Compass IP Law PC

(57) ABSTRACT

Methods, apparatus, and software for hardware reliability diagnostics and failure detection via parallel software computation and compare. Parallel testing is performed on hardware resources such as processor cores, accelerators, and Other Processing Units (XPUs) using test algorithms such as encryption/decryption. The results of the testing (the algorithm outputs) are compared to detect errant hardware. Comparison may be across cores (via execution of software-based algorithms), across accelerators/XPUs (via algorithms implement in hardware) or between cores and accelerators/XPUs. Techniques are disclosed to enable all cores to be tested while a platform is performing a workload, such as in a data center environment, wherein unused cores are used for testing, with workloads being migrated between cores between tests.

20 Claims, 8 Drawing Sheets

Test Management Software Module

400

Test Algorithm Software Module

402

Test GUI Software Module

404

Error Report Module

406

Workload Software

408

HARDWARE RELIABILITY DIAGNOSTICS AND FAILURE DETECTION VIA PARALLEL SOFTWARE COMPUTATION AND COMPARE

BACKGROUND INFORMATION

Hardware degradations and failures are an inescapable fact of life related to modern compute systems. These failures can manifest themselves as small and infrequent data corruption issues, intermittent system slow-downs, system lockups, or even catastrophic system failures. Early detection and replacement of faulty compute hardware is crucial to mitigate any damage realized by these types of degradations and/or failures. This is especially important in today's large cloud service provider datacenters that provide large-scale e-commerce, financial, healthcare, and scientific data processing tasks, as well as mission-critical edge compute such as Autonomous Driving.

Currently in datacenter environments, when an abnormal data processing issue is detected the offending system is taken offline and isolated or "quarantined." Various hardware validations are then performed on the isolated system and next steps are determined. Sometimes hardware is replaced, and the system is returned to active status. Sometimes the issue cannot be reproduced, and the system is returned to active status with no root-cause or recourse, adding risk of future failures while in operation and disrupting service.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
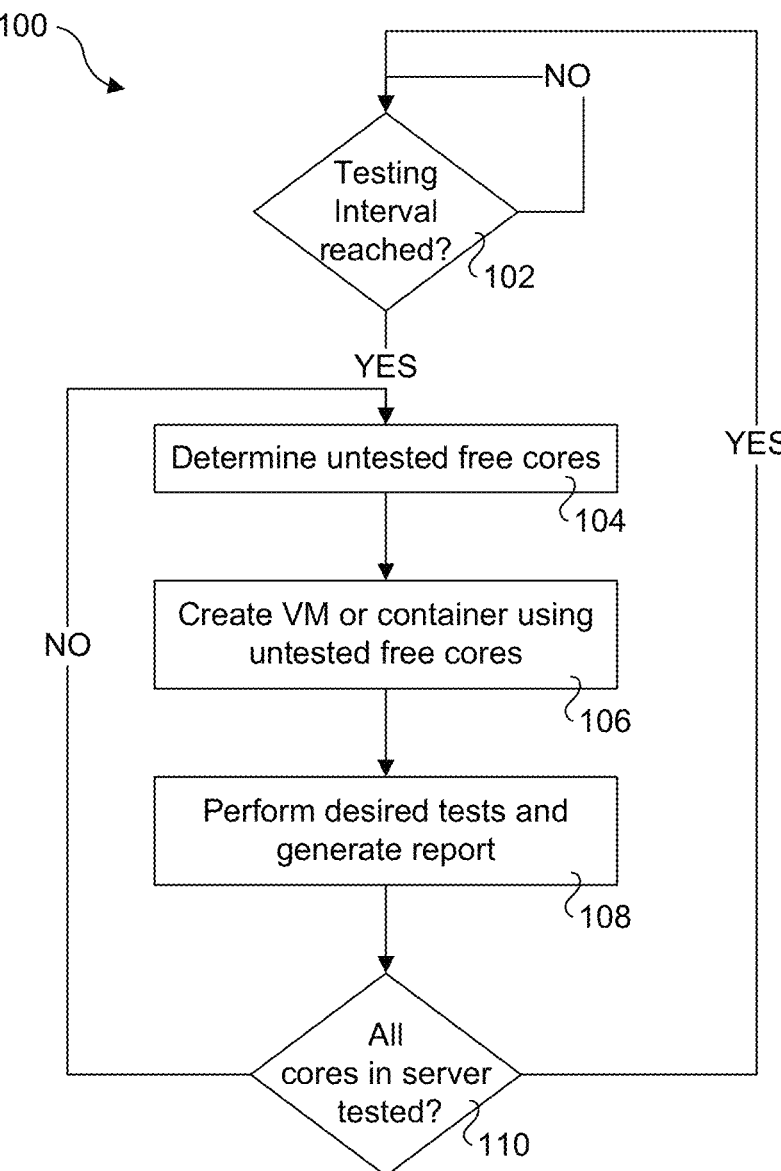
FIG. 1 is a flowchart illustrating operations and logic performed during test harness execution.

Embodiments of methods, apparatus, and software for hardware reliability diagnostics and failure detection via parallel software computation and compare are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a methods, apparatus, and software for testing compute system hardware either in a laboratory environment on an idle system, or in datacenter environment while running "live" customer workloads is provided. Parallel testing is performed on hardware resources such as processor cores, accelerators, and Other Processing Units (XPUs) using test algorithms such as encryption/decryption. The results of the testing (the algorithm outputs) are compared to detect errant hardware. Comparison may be across cores (via execution of software-based algorithms), across accelerators/XPUs (via algorithms implement in hardware) or between cores and accelerators/XPUs.

Generally, a "launched" test application can either run exclusively, consuming all system resources, or run in parallel on unused cores with currently executing workloads, testing the collection of unused (idle) system resources. In cases where the test application is to be run exclusively, any workloads running on virtual machines (VMs) or in containers can be migrated out, the test application can be executed for the desired amount of time, reporting any detected error(s), then any migrated VMs or containers can be reinstated. This type of operation is useful when trying to reproduce intermittent failures, or for burn-in of new systems in order to accelerate early life failure before deployment to run customer workloads.

In cases where hardware testing is being performed on system resources (e.g., cores) not being utilized by active workloads, datacenter system administrators have the ability to rotate compute jobs to already tested hardware (cores), and the desired test application can be repeatedly launched on untested cores until all system hardware has been tested.

This cycle of testing can be done at a regular cadence throughout the life of the targeted system(s) deployed in a lab or datacenter.

The embodiments implement several methods of determining test results. First, there are test algorithms that have expected results embedded within the test. For example, a numerical calculation can be compared with predetermined expected results loaded into a memory location. Next, identical operations can be performed on different cores simultaneously, and the results compared to each other. An example of this would be encrypting a plain text pattern on 3-5 different cores simultaneously and comparing the resultant encrypted patterns from all cores to each other. The encrypted patterns could then be decrypted and the plain text from all cores compared to each other. Additionally, or alternatively, software algorithms that simulate hardware accelerator functionality could be used to compute expected results from the accelerator and compare to actual hardware results. An example of this is shown in the screen captures of FIGS. 5 and 6 below.

Many silicon component manufacturers utilize high-volume manufacturing test equipment and internally developed test software to validate that manufactured component parts are fully functional prior to shipment. Historically these types of validation tests are executed on raw piece parts, which means that these parts are not integrated into end user systems.

Furthermore, the piece part validation software is normally executed in a "bare-metal" environment on the high-volume testers, where "bare-metal" indicates that there is no operating system interaction with the test software. This type of validation/test is usually done on individual parts in the minimum possible time to verify the full functionality of thousands of parts per hour or day. The tested piece parts are then sold to either system integrators or end users, who incorporate the parts in fully functional compute systems that are then deployed for use. For example, these end use compute systems could be embedded controllers for manufacturing, test equipment controllers, personal computers, or large-scale server platforms.

As with any manufactured item, there are a certain number of parts that experience early life failures, exhibit unexpected reactions to the end system configurations that they are incorporated into, or just exhibit degradations over time due to environmental reasons (e.g. temperature). These types of failures are normally detected by experiencing unexpected compute operations, invalid results, or by executing offline system diagnostics which report any detected issues.

In most cases, system degradations or failures can be dealt with by simply replacing a defective part and repeating any corrupted or terminated compute operation. However, if degraded or defective components are installed for example in large-scale datacenters (e.g., e-commerce, financial, healthcare, scientific operations) or Autonomous Driving who perform mission critical activities, the consequences could be catastrophic. The consequences include loss of revenue, loss of customers, legal action, or worse.

With the foregoing in mind, the following description of an exemplary embodiment is targeted at testing two or more multi-core processing units (e.g., CPUs, GPUs, etc.) installed in server platforms deployed in large-scale datacenters. Note that the principles and teachings disclosed herein can be extended to include not only CPUs, but all types of compute component parts and peripherals, in all types of end user platforms. These include "Other Processing Units" (collectively termed XPUs) including one or more of Graphic Processor Units (GPUs) or General Purpose GPUs (GP-GPUs), Tensor Processing Unit (TPU) Data Processor Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of CPU/processor cores, this is merely exemplary and non-limiting. Generally, any type of XPU or XPU core may be used in place of a CPU or CPU core in the illustrated embodiments. Moreover, as used in the following claims, the term "processor" is used to generically cover CPUs and various forms of XPUs.

Today's datacenters have thousands of large-scale server platforms with multiple socketed multi-core CPUs installed on-site. These servers perform many mission critical compute tasks for individual small business clients, many fortune-500 companies, colleges and universities, as well as the federal government. Some of these compute tasks include record storage, e-commerce applications, financial transactions, and even large-scale scientific computations. In all cases these tasks are important to each paying customer and any loss or corruption of data, or loss of service, due to faulty or intermittent equipment is not acceptable.

In one aspect, the embodiments comprise a software test harness configured to run on one or more CPU cores at a time, and on one to many servers at a time within a lab or datacenter. The test harness executes a predetermined subset of platform functionality tests or "screens," either consuming all system resources, or while other workloads are concurrently running. Any discrepancy or data corruption issue found by the screen is logged for analysis and further action by the technician or datacenter manager. In the case where screens are executed concurrently with customer workloads, both the screen and customer workloads are then rotated to another set of cores to repeat the process until all sockets and cores within each server platform is fully tested. By testing platform functionality on a small set of cores at a time zero down time is achieved, and by rotating the screen through all cores, each CPU part in each socket of each server in an entire datacenter or selected aggregation level in a datacenter (e.g., rack-level, pod-level, etc.) can be tested. When consuming such system resources when testing, initial burn-in and early life failure detection can be achieved.

By running the tests at predefined intervals on each server in the datacenter or aggregation level, the risk of data loss or corruption can be mitigated by finding degraded parts in an efficient manner.

Some embodiments may be implemented as an operating system daemon or service that is normally idle or sleeping. At a predetermined interval, e.g., every 24 hours, the service "wakes-up," instantiates itself as a low priority thread of execution on selected logical processors in the system under test.

FIG. 1 shows a flowchart 100 illustrating operations and logic performed during test harness execution. In a decision block 102, a determination is made to whether a testing interval is reached. For example, the testing interval may be a fixed period, such as once every 24 hours, but more generally could be any number of hours or days. When the testing interval has been reached, the answer to decision block 102 is YES, and the logic proceeds to a block 104 to determine (e.g., identify) untested free cores for the device/platform under test. An untested free core is a core that is currently not performing a workload (is free) that has yet to be tested during a current test cycle. In a block 106, a VM or container is created using an untested free core. In a block 108, desired tests are performed on the core and corresponding test reports are generated by running test software in the VM or container created in block 106.

As shown in a decision block 110, a determination is made to whether all cores in the server or test platform have been tested. If they have not, the answer is NO, and the logic loops back to block 104 to perform the operations of blocks 104, 106, and 108 on another processor core. Once all cores in the server/platform have been tested, the answer to decision block 110 is YES, and the logic loops back to decision block 102 to wait until the next test interval.

Figure 2:
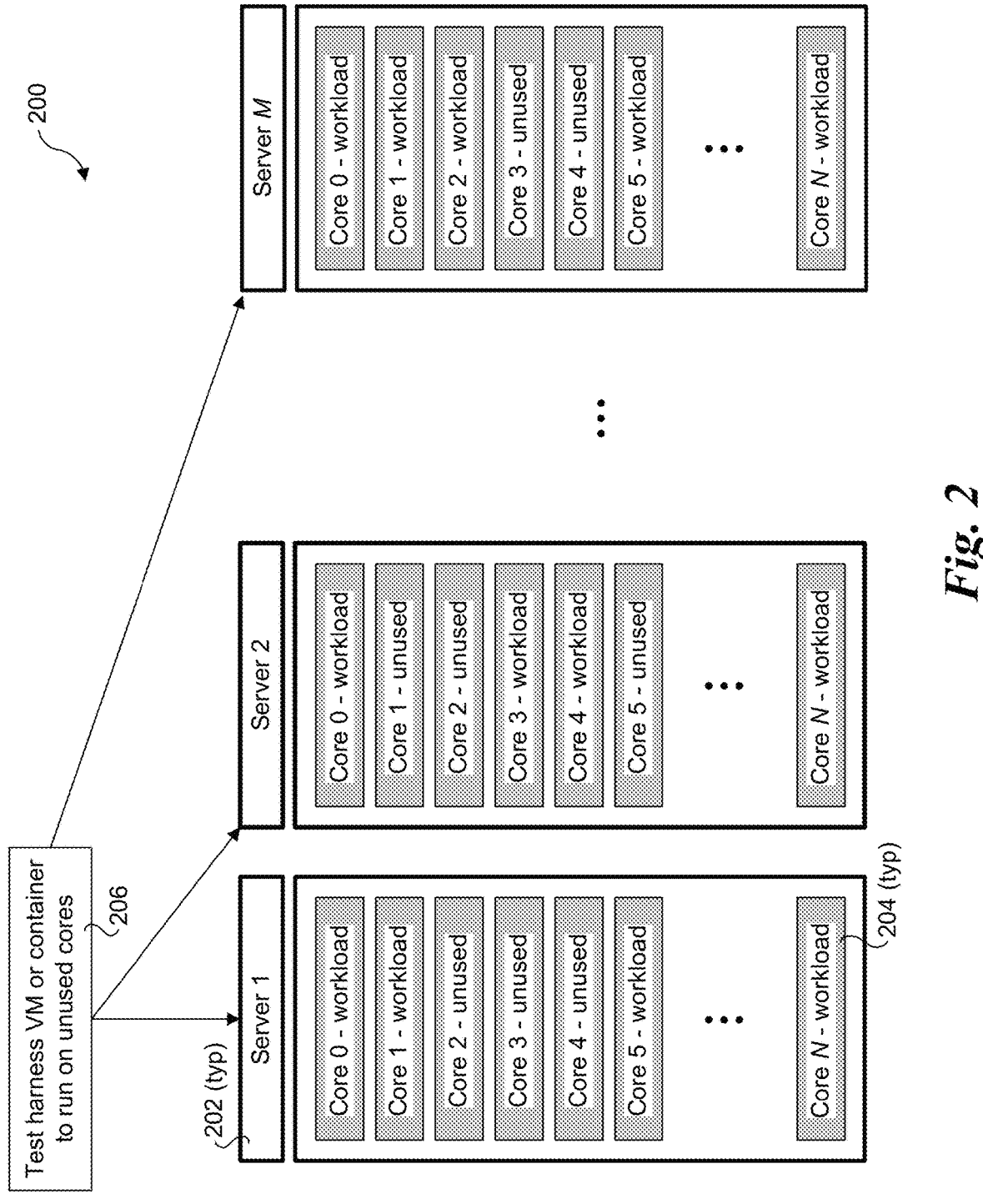
FIG. 2 is a diagram illustrating an exemplary test configuration implemented on M servers, each including N cores.

FIG. 2 shows a diagram 200 illustrating an exemplary test configuration implemented on M servers 202, each including N cores 204, wherein M and N are integers. Depending on the service(s) performed for the group of servers being tested, core 204 for each of the servers 202 may have similar workloads or the workloads may differ. It is also common for the workload handled by a given server (or set of servers) to vary throughout the day, and different services (or modules supporting a given service or set of services) may be taken offline and put back online based on current customer needs.

As shown in FIG. 2, server 1 is currently employing core 0, 1, 5, and N for workload, while cores 2-4 are unused. For server 2, cores 0, 3, 4, and N are used for workload, while cores 1, 2, and 5 are unused. For server M, cores 0-2, 5, and N are used for workload, while cores 3 and 4 are unused.

As shown in a block 206, a test harness container is to run on the unused cores. In one embodiment, the test harness container uses the operations and logic illustrated for flowchart 100 above. The test harness container may also implement aspects illustrated in FIGS. 3, 3a, and 4-6, as well.

Test Examples

Generally, various tests may be run to verify components and systems are operating properly, where individual tests may be targeted to specific types of components. For example, today's data center platforms may include one or more "accelerators" that are used to offload tasks from CPUs/processor cores. In some instances, the accelerators are configured to perform an algorithm, such as an encryption/decryption algorithm or a compression/decompression algorithm. These algorithms are generally well-known and may be implemented using software executing on a processor core or via embedded hardware/embedded logic, which is used by the accelerators. For the same input data and same algorithm, the result using either of these approaches should be identical.

In view of this, core operation and accelerator operation can be tested and verified to be operating properly by comparing the output of the software-based algorithm executing on a core and the output of the embedded hardware-based algorithm implemented by an accelerator, XPU, or the like. If the outputs match, the core and accelerator are verified as operating properly. If the outputs do not match, then either the core of the accelerator is not operating properly.

In some instances, one may be able to verify which is not operating properly by comparing the result with a second core or multiple other cores. If the cores match, and the accelerator does not match, then there may be a likelihood that the accelerator is errant. If the output of the cores do not match, there may be a likelihood that the mismatching core (the core with an output that doesn't match the other core and the accelerator) may be errant.

Figure 3:
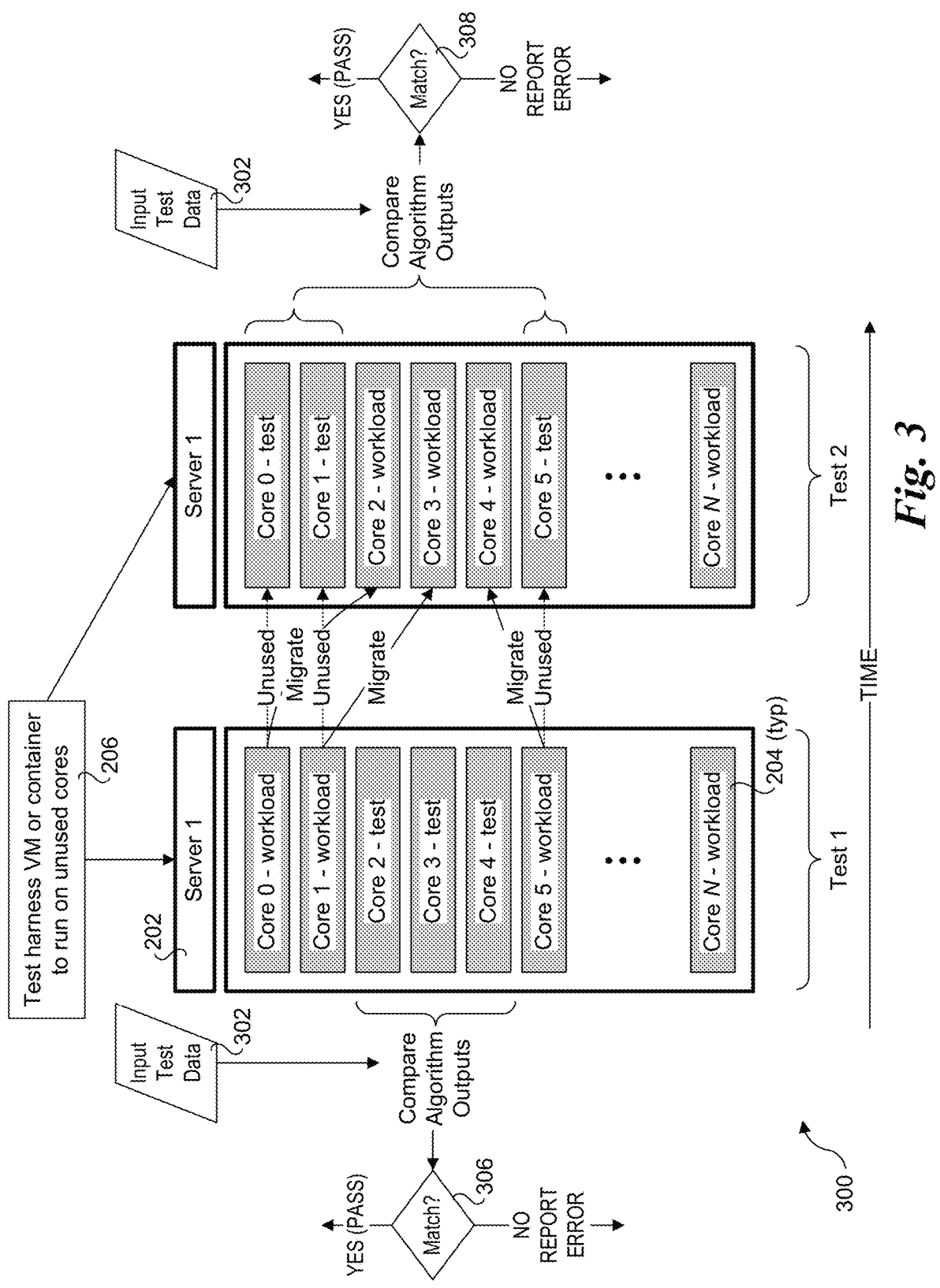
FIG. 3 is a diagram illustrating a test sequence for a platform comprising a server to test the operation of the cores in the server's multi-core processor.

FIG. 3 shows a test sequence 300 for a platform comprising a server 202 (also labeled as Server 1). During a first test (Test 1), cores 0, 1, 5 . . . and N are used to perform tasks associated with a workload via execution of workload software. In this example cores that are used to execute workload software at a given point in time or timeframe are referred to as "workload cores." During Test 1, cores 2-4 are initially not being used (or otherwise may comprise any core that is not executing a workload) and are used to execute one or more test algorithms during Test 1. Accordingly, cores that are being tested may be referred to as "unused cores" or "test cores." During Test 1, cores 2-4 execute test algorithm software comprising one or more test algorithms on one of more sets of input test data 302.

Generally, the input test data will be targeted for a particular algorithm or set of algorithms. For example, for an encryption algorithm it is preferable to use unencrypted alphanumeric content the is commonly referred to as "plain text." The same is true for testing a compression algorithm. For testing a decryption algorithm, the input test data may comprise encrypted content that is encrypted using an encryption algorithm that is paired with a symmetrical decryption algorithm such that the result following decryption (test output) is the original plain text data. As shown in the screen captures in FIGS. 5 and 6 below, radio buttons enable a user to view data in encrypted or decrypted form. For testing a decompression algorithm, the test input data may comprise data that has been compressed with a matching compression algorithm.

As show on the left side of FIG. 3, the output of the test algorithm software that is executed on cores 2-4 is compared to the outputs of the other cores. A determination is made to whether or not the outputs match, as depicted by a decision block 306. If the outputs match, the answer to decision block 306 is YES, and the result of the test for the set of test cores and algorithm is a PASS. If the outputs do not match, the answer to decision block 306 is NO, and a corresponding error is reported. When three or more cores are tested in parallel, in one embodiment a voting system is used such that the majority of cores generating matching outputs are deemed valid, and the core with the non-matching output is deemed errant. For example, in this example if cores 2 and 3 output the same output data and core 4 outputs data that differs (e.g., at least some of the output data for a given input data does not match), then an error for core 4 is detected and reported.

Between Test 1 and Test 2, the workload(s) is/are migrated from cores 0, 1 and 5 to cores 2-4, respectively. Now cores 0, 1, and 5 become test cores and cores 2-4 become workload cores during Test 2. The outputs of cores 0, 1, and 5 are compared, as indicated by a decision block 308. As before, if the outputs match, the output of decision block 308 is YES (indicating the cores PASSED) testing of the algorithm, while if one of the cores outputs any data that does not match, the output of decision block 308 is NO, and a corresponding error is reported.

In one embodiment, testing is continued in a similar manner using a test, migrate, test, migrate . . . pattern until all the cores have been tested a least once. Testing for a given algorithm may be performed over one or more sets of input data. Similarly, during a given configuration cycle (that is a cycle during which the workload and test cores do not change), one or more algorithms may be tested by executing corresponding test algorithm software on the test cores.

Figure 3A:
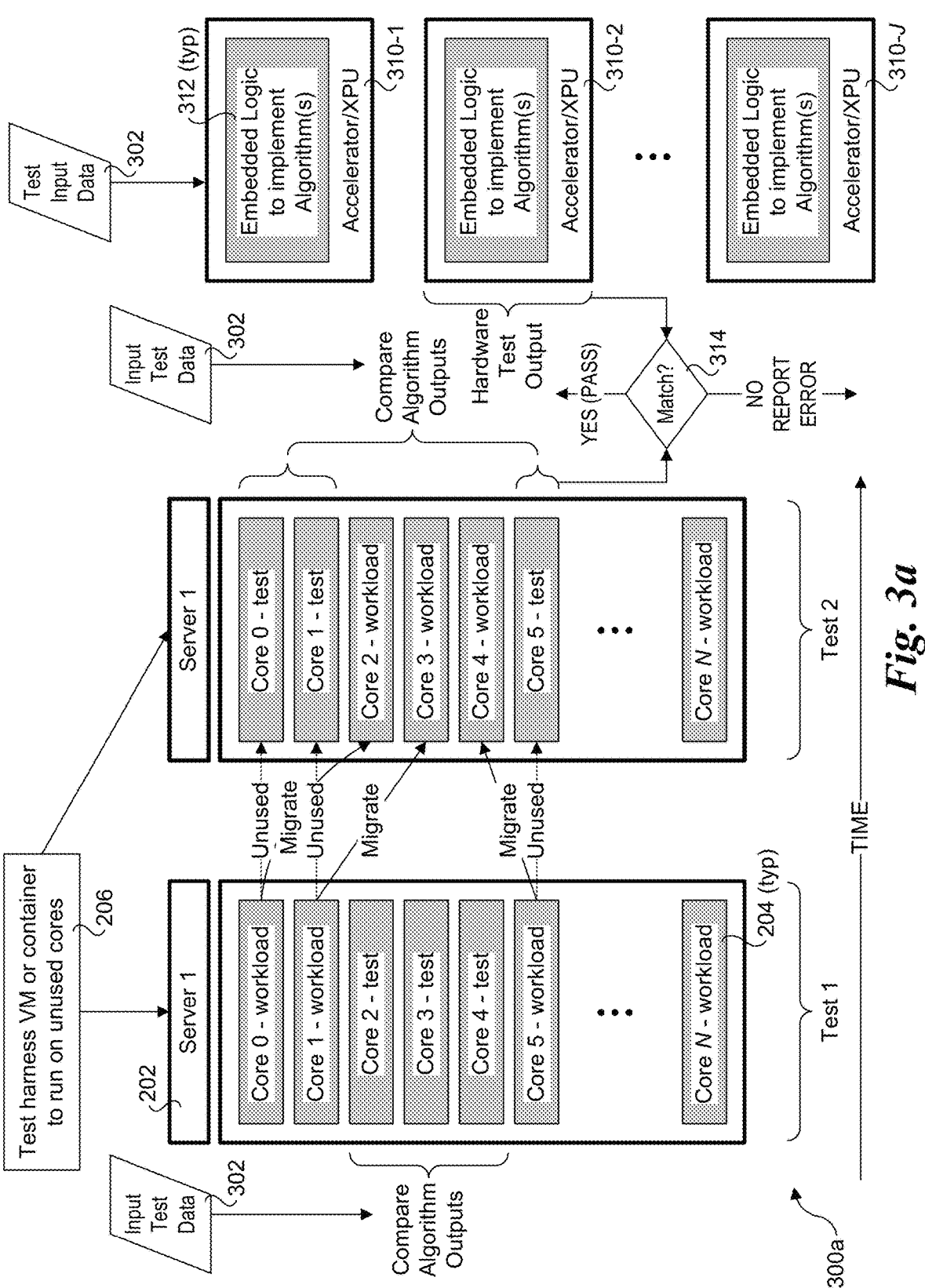
FIG. 3a is a diagram illustrating an extension of the test sequence of FIG. 3 that further includes testing one or more accelerators or XPUs.

FIG. 3a shows a test sequence 300a that further includes testing one or more accelerators or XPUs, as depicted by accelerator/XPUs 310-1, 310-2, . . . 310-J. Each accelerator/XPU includes embedded logic 312 configured to implement one or more algorithms, such as but not limited to encryption/decryption and compression/decompression algorithms. Embedded logic generally includes logic implemented in circuitry, such as using an FPGA or using preprogramed or fixed hardware logic (or a combination of pre-programmed/hard-coded and programmable logic), as well as firmware executing on one or more embedded processors, processing elements, engines, microcontrollers or the like.

In the example shown in FIG. 3*a*, testing of accelerator/XPUs 310-1, 310-2, . . . 310-J may be performed on an individual accelerator/XPU, or may involve the testing of multiple accelerators/XPUs in parallel. In the illustrated embodiment, the output for test cores 0, 1, and 5 is presumed to match, indicating the cores are operating properly. Thus, the output from a single test core (core 5 in this example) is compared with the output of one or more of accelerator/XPUs 310-1, 310-2, . . . 310-J to verify the accelerator/XPU is/are operating properly. The same algorithm is used for a given test, with a software version of the algorithm being executed on the test cores, and an embedded version of the algorithm being implemented on the accelerator/XPU.

As depicted by a decision block 314, when the outputs match, the result of the test is a PASS. Otherwise, if the output of an accelerator/XPU does not match the output of the test core(s), a corresponding error is detected and reported.

In one embodiment, testing of two or more accelerator/XPUs are performed in parallel against each other, without comparing the test output to test output data produced via execution of a software version of an algorithm on a test core. As before, when three or more accelerators/XPUs are tested in parallel, a majority voting scheme may be implemented to determine which accelerator or XPU is errant.

Figure 4:
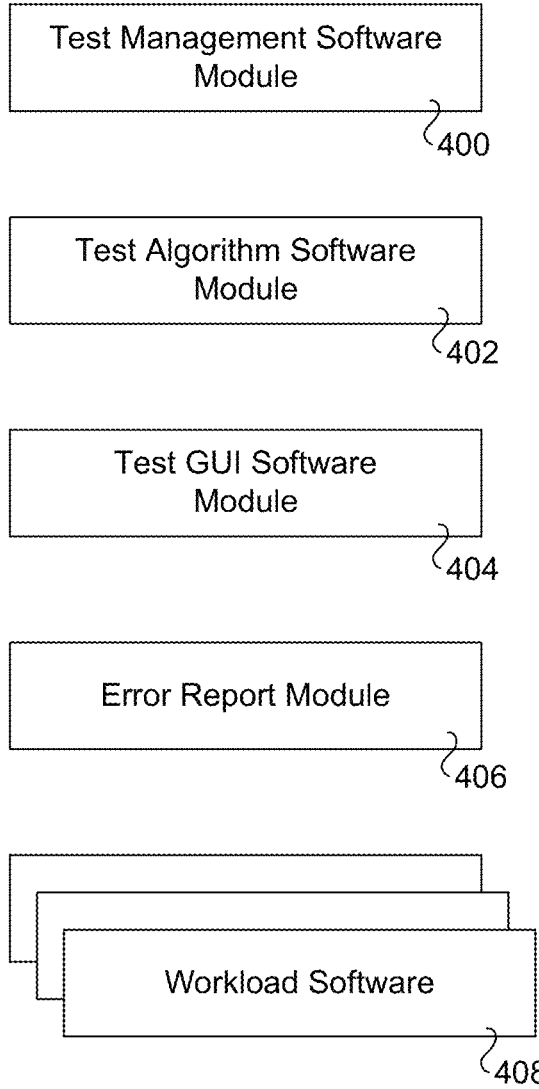
FIG. 4 is a block diagram illustrating an exemplary set of software components that are executed on a platform to facilitate testing, error detection, and reporting, according to one embodiment.

FIG. 4 shows an exemplary set of software components that are executed on a compute platform during testing, according to one embodiment. The software components include a test management software module 400, a test algorithm software module 402, a test Graphical User Interface (GUI) software module 404, an error report module 406, and workload software 408. In other embodiments, two or more of the software modules other than workload software 408 may be combined or a given software module may be split into two or more modules. Generally, each of the software modules will comprise compiled software instructions (e.g., machine code) configured to be executed on the processor cores for a given processor architecture.

Test management software module 400 comprises software for implementing the overall testing scheme or package. For example, this software may be used for launching test algorithm software on test cores and for migrating workloads between test cycles. Optionally, test management software module may leverage existing workload migration software.

Test algorithm software module 402 includes software to be executed on the cores to implement one or more test algorithms, such as but not limited to encryption algorithms, decryption algorithms, compression algorithms, and decompression algorithms. Test algorithm software module 402 may also include software for collecting test data output.

Test GUI software module provides a GUI that may be used to configure test parameters and the like and to view test results (e.g., the aforementioned "screens." Examples of test GUIs are presented in FIGS. 5 and 6 below.

Error report module 406 includes software for comparing test output data, detecting errors, and generating corresponding error reports. For example, in one embodiment an error report will identify the core, accelerator, or XPU that is errant, the algorithm and/or test being performed, and other optional data, such as the input test data and output test data and/or other diagnostic data.

Workload software 408 comprises software that is executed on the processor cores to perform one or more workload tasks. Generally, workload software may be stored on board the platform (e.g., in a storage device) or loaded from a remote storage device over a network or fabric.

Screen Captures

Once a software-based result of an accelerator algorithm that is different from the hardware-based result is detected, the data mismatch is alerted to the system administrator via (a) standard notification mechanism(s) (e.g., Data Center Alerting via Telemetry & Notifications). The software-based results, along with the input stimulus, and expected results is stored to a disk file, and a technician can later open this file and use any required tools to troubleshoot and root-cause the source of the difference in results.

Figure 5:
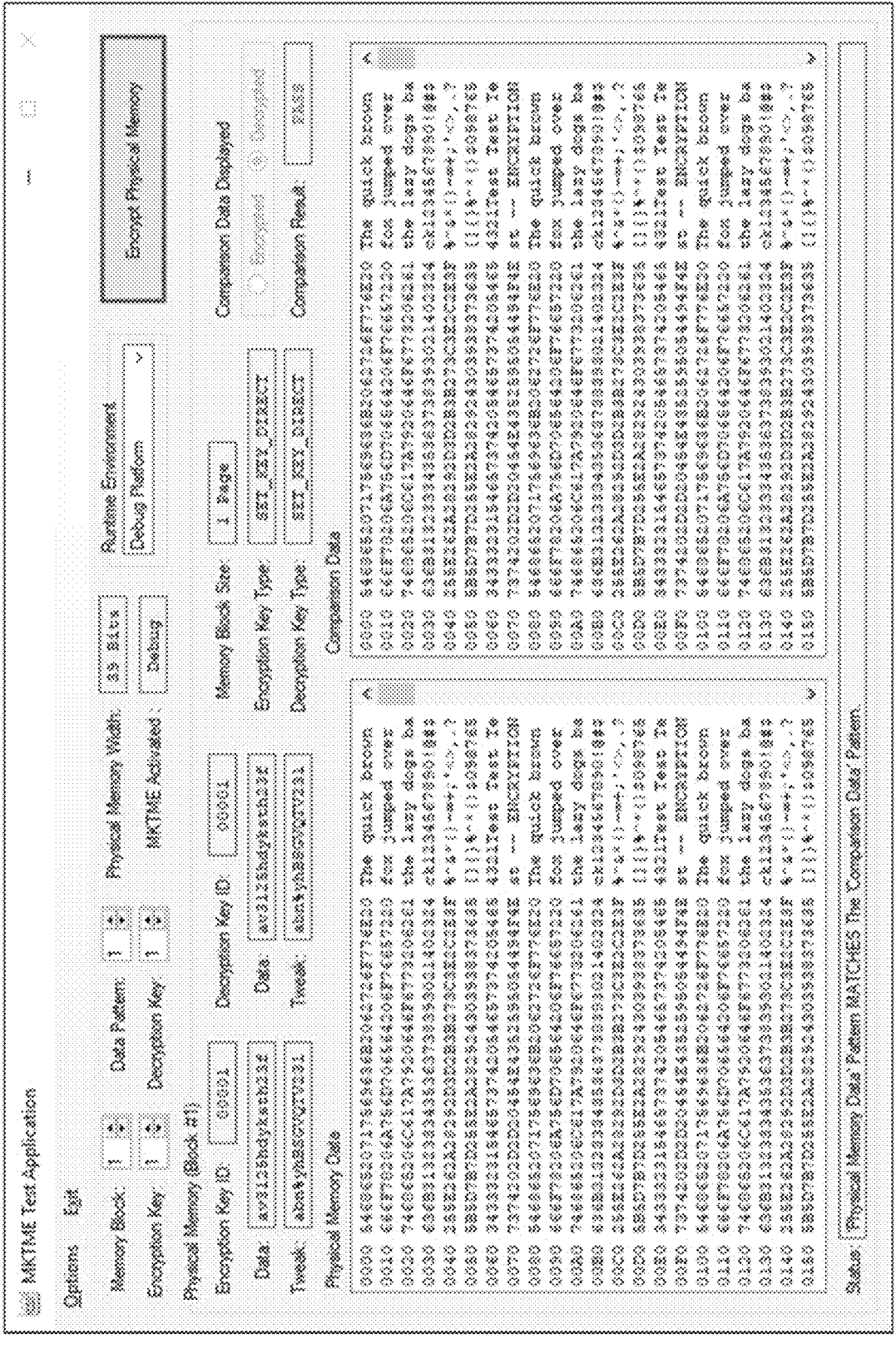
FIG. 5 is a screen capture of a Graphical User Interface (GUI) for a test application illustrating decrypted physical memory and comparison data for a physical memory encryption test.
Figure 6:
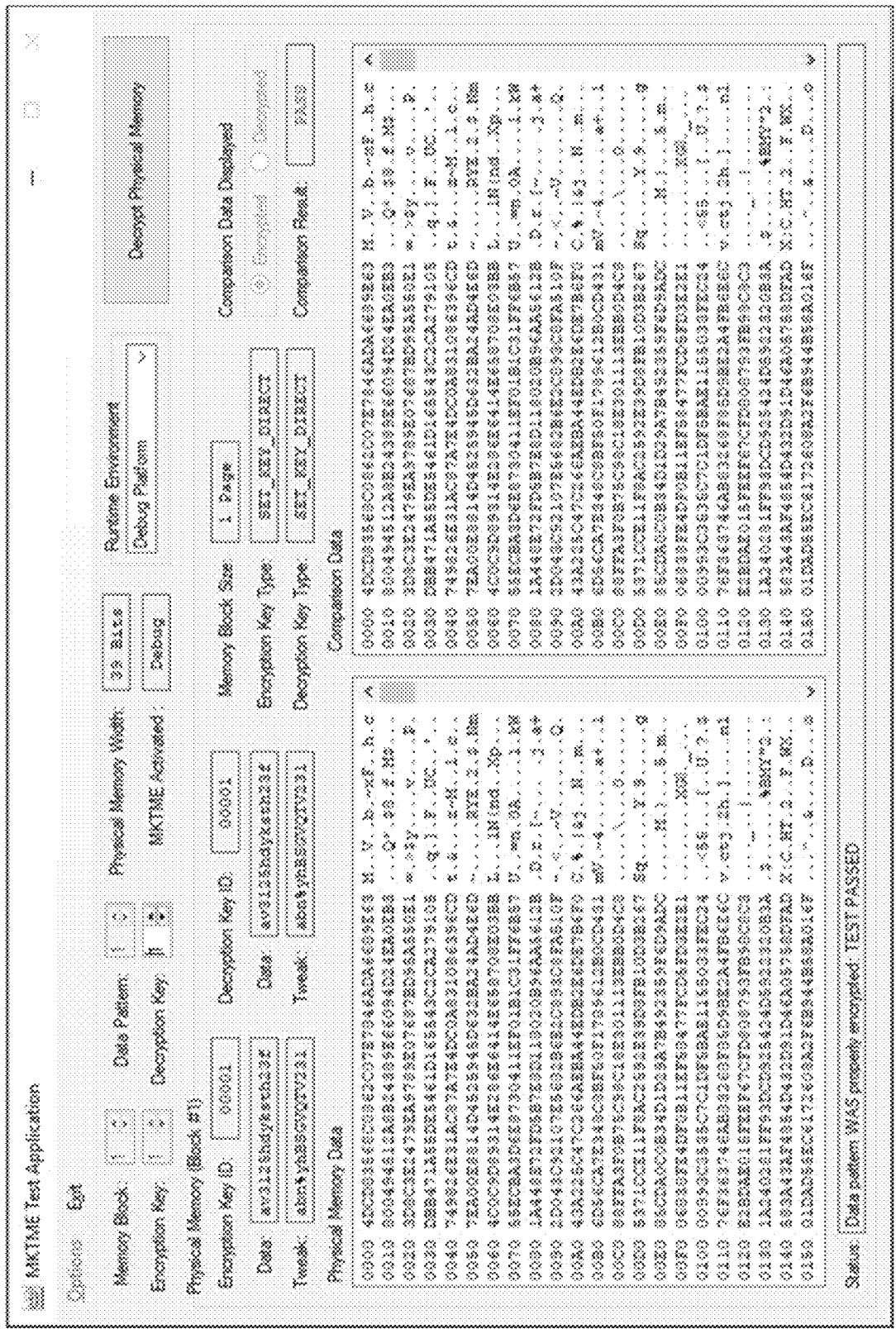
FIG. 6 is a screen capture of the GUI for the test application illustrating encrypted physical memory and comparison data for a physical memory decryption test.

FIGS. 5 and 6 respectively depict screen captures 500 and 600 of a standalone debug tool that could be used to troubleshoot and root-cause the source of data mismatches between software and hardware algorithms. Screen capture 500 in FIG. 5 shows the decryption results of both hardware (left) and software (right) decryption of a predefined pattern written to memory. If the data from both hardware and software algorithms match, the comparison result is "PASS"; otherwise the comparison result would show "FAIL."

Screen capture 600 of FIG. 6 shows the encryption results of both hardware (left) and software (right) decryption of a predefined pattern written to memory. If the data from both hardware and software algorithms match, the comparison result is "PASS"; otherwise the comparison result would show "FAIL."

It is noted that the standalone tool used for the screen captures in FIGS. 5 and 6 is merely one example of a tool that may be used to confirm/verify operation of platform components such as cores and embedded hardware (e.g., accelerators) and/or XPUs. Generally, the principles and teachings herein may be implemented to automatically perform a variety of troubleshooting actions. Such tools may employ a Graphical User Interface (GUI) such as shown in FIGS. 5 and 6, a text file, a set of descriptive error codes, JSON (JavaScript Object Notation) or YAML (Yet Another Markup Language) files, or other means for storing and/or presenting test results.

In one embodiment, in the GUI implementation of memory encryption software simulation of memory encryption hardware acceleration, the in-field implementation would have all encryption and decryption comparisons done on memory buffers.

Example Platform/Server

Figure 7:
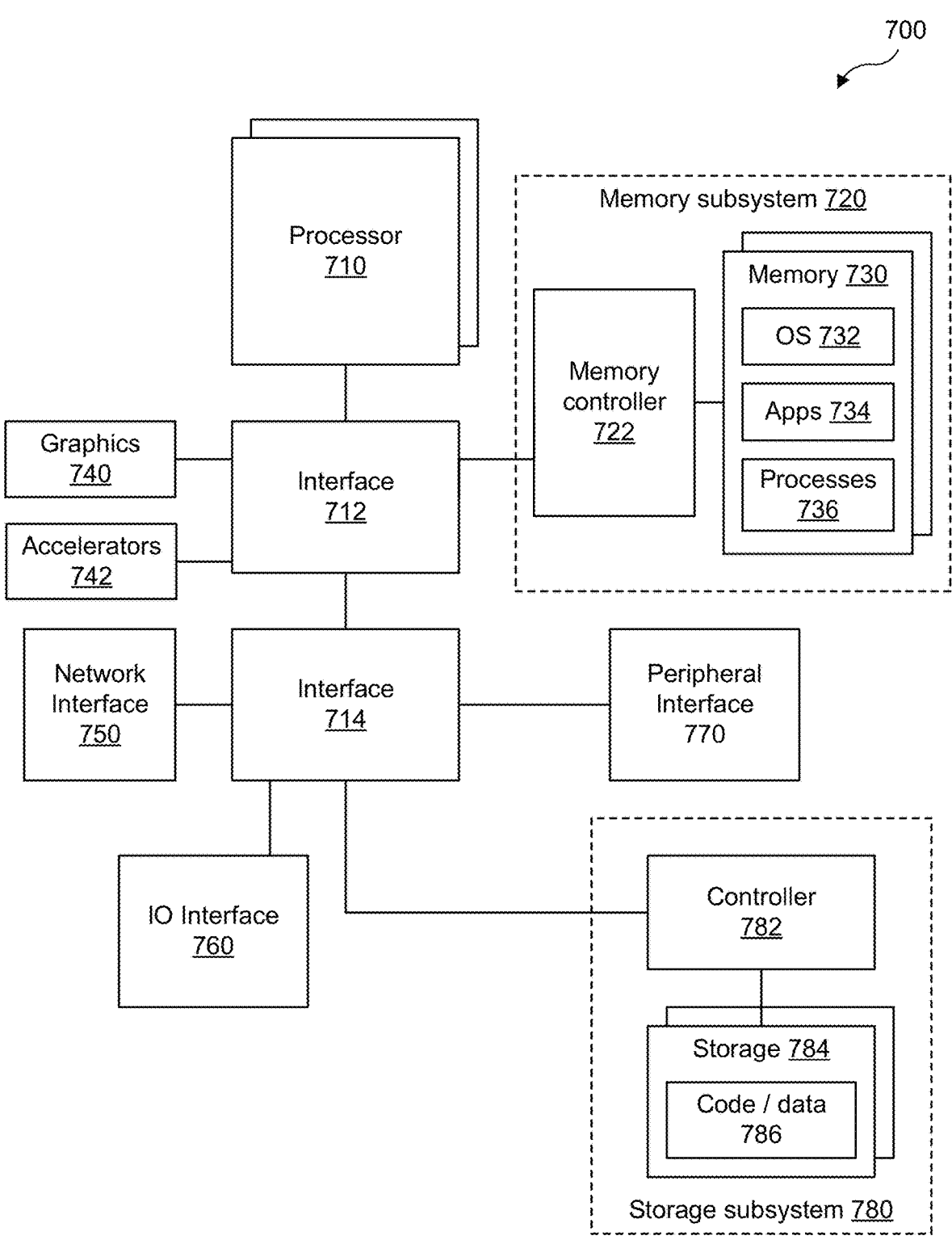
FIG. 7 is a diagram of a computing system that may be implemented with aspects of the embodiments described and illustrated herein.

FIG. 7 depicts a compute platform 700 such as a server or similar computing system in which aspects of the embodiments disclosed above may be implemented. Compute platform 700 includes one or more processors 710, which provides processing, operation management, and execution of instructions for compute platform 700. Processor 710 can include any type of microprocessor, central processing unit (CPU), graphics processing unit (GPU), processing core, multi-core processor or other processing hardware to provide processing for compute platform 700, or a combination of processors. Processor 710 controls the overall operation of compute platform 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, compute platform 700 includes interface 712 coupled to processor 710, which can represent a higher speed interface or a high throughput interface for system components that needs higher bandwidth connections, such as memory subsystem 720 or optional graphics interface components 740, or optional accelerators 742. Interface 712 represents an interface circuit, which can be a standalone component or integrated onto a processor die. Where present, graphics interface 740 interfaces to graphics components for providing a visual display to a user of compute platform 700. In one example, graphics interface 740 can drive a high definition (HD) display that provides an output to a user. High definition can refer to a display having a pixel density of approximately 100 PPI (pixels per inch) or greater and can include formats such as full HD (e.g., 1080 p), retina displays, 4K (ultra-high definition or UHD), or others. In one example, the display can include a touchscreen display. In one example, graphics interface 740 generates a display based on data stored in memory 730 or based on operations executed by processor 710 or both. In one example, graphics interface 740 generates a display based on data stored in memory 730 or based on operations executed by processor 710 or both.

In some embodiments, accelerators 742 can be a fixed function offload engine that can be accessed or used by a processor 710. For example, an accelerator among accelerators 742 can provide data compression capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 742 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of compute platform 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in compute platform 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for compute platform 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that compute platform 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, PCI Express (PCIe), a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute platform 700 includes interface 714, which can be coupled to interface 712. In one example, interface 714 represents an interface circuit, which can include standalone components and integrated circuitry. In one example, multiple user interface components or peripheral components, or both, couple to interface 714. Network interface 750 provides compute platform 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can receive data from a remote device, which can include storing received data into memory. Various embodiments can be used in connection with network interface 750, processor 710, and memory subsystem 720.

In one example, compute platform 700 includes one or more IO interface(s) 760. IO interface 760 can include one or more interface components through which a user interacts with compute platform 700 (e.g., audio, alphanumeric, tactile/touch, or other interfacing). Peripheral interface 770 can include any hardware interface not specifically mentioned above. Peripherals refer generally to devices that connect dependently to compute platform 700. A dependent connection is one where compute platform 700 provides the software platform or hardware platform or both on which operation executes, and with which a user interacts.

In one example, compute platform 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (e.g., the value is retained despite interruption of power to compute platform 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to compute platform 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of compute platform 700. More specifically, power source typically interfaces to one or multiple power supplies in compute platform 700 to provide power to the components of compute platform 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, compute platform 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

The principles and teachings herein may also be applied to shared and scalable I/O devices employing hardware-assisted I/O virtualization. Such scalable I/O devices include but are not limited to network controllers, storage controllers, GPUs, and other hardware accelerators, which may be efficiently shared across multiple containers or virtual machines. An aspect of these devices is "composability", which allows more frequent and performance-critical operations to be run directly on hardware while complex control and configuration operations are emulated through software. Under the techniques disclosed herein, scalable I/O devices may be composed to dedicate hardware resources such as accelerators for testing during run-time operations.

Resources used for testing may employ microservices and the like, such as implemented using Kubernetes® and/or Docker®. For instance, a Kubernetes® pod or a Docker® container may be allocated a dedicated level of a core's processing cycles for performing algorithm testing.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'J', 'M', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for testing operation of hardware resources on a compute platform having a processor with a plurality of central processing unit (CPU) cores, comprising:

for one or more test runs, for each of multiple CPU cores among the plurality of CPU cores, implementing respective instances of one or more algorithms via execution of software instructions on the CPU core to calculate output values over one or more sets of input test data;

for each of the one or more algorithms and one or more
sets of input test data, comparing the output values of
the respective instances of the algorithm across two
or more CPU cores to verify they match; and
when it is detected there is not a match, reporting
detected errors based on comparison of the output
values.

2. The method of claim 1, wherein during the one or more
test runs output values for at least one algorithm are calcu-
lated via execution of the algorithm for at least one set of
input test data at least once for each of the plurality of CPU
cores.

3. The method of claim 1, wherein the compute platform
is operated in a data center environment and is executing a
workload on a first portion of the plurality of CPU cores,
further comprising:
while executing the workload on the first portion of the
plurality of CPU cores,
identifying multiple unused CPU cores among the
plurality of CPU cores that are not being used to
execute the workload;
executing, in parallel, respective instances of the one or
more algorithms on each CPU core in at least one set
of the unused CPU cores among the multiple unused
CPU cores;
comparing output values of the respective instances of the
one or more algorithms to verify they match; and
when there is not a match, reporting detected errors
including an identity of a CPU core producing output
values that do not match the output value of at least one
other CPU core.

4. The method of claim 3, further comprising:
performing testing of the one or more algorithms over a
plurality of sets of unused CPU cores, wherein each set
of unused CPU cores comprises a different combination
of unused CPU cores, and wherein for a test over a
given set of unused CPU cores execution of the one or
more algorithms on the CPU cores in the given set of
unused CPU cores is performed in parallel.

5. The method of claim 4, further comprising:
employing a first set of workload CPU cores to execute
the workload while concurrently performing first hard-
ware resource testing on a first set of unused CPU cores
that are not among the first set of workload CPU cores;
following the first hardware resource testing, migrating
execution of the workload from at least one workload
core in the first set of workload CPU cores to at least
one unused CPU core among the first set of unused
CPU cores to establish a second configuration com-
prising a second set of workload CPU cores and a
second set of unused CPU cores; and
employing the second set of workload CPU cores to
execute the workload while concurrently performing
second hardware resource testing on the second set of
unused CPU cores.

6. The method of claim 5, wherein the method operations
are repeated until hardware resource testing of all CPU cores
has been performed at least once.

7. The method of claim 1, wherein the platform includes
one or more accelerators or Other Processing Units (XPUs)
configured to implement at least one of the one or more
algorithms using embedded logic, further comprising:
implementing a first instance of a first algorithm over a
first set of input test data via execution of software
instructions on one of the plurality of CPU cores to
output a first set of output values;

implementing a second instance of the first algorithm over
the first set of input test data on an accelerator or XPU
to output a second set of output values;
comparing the first and second set of output values to
verify they match; and
when there is not a match, reporting detected errors for the
accelerator or XPU.

8. The method of claim 1, wherein the platform includes
one or more accelerators or Other Processing Units (XPUs)
configured to implement at least one of the one or more
algorithms using embedded logic, further comprising:
for multiple CPU cores among the plurality of CPU cores,
implementing first instances of a first algorithm over a
first set of input test data via execution of software
instructions on the CPU core to output a respective
first set of output values;
implementing a second instance of the first algorithm over
the first set of input test data on a first accelerator or
XPU to output a second set of output values;
comparing the respective first sets of output values to
verify they match;
when they match, comparing one of the respective first
sets of output values and the second set of output values
to verify they match; and
when there is not a match, reporting detected errors for the
first accelerator or XPU.

9. The method of claim 8, further comprising:
implementing a third instance of the first algorithm over
the first set of input test data on a second accelerator or
XPU to output a third set of output values;
performing at least one of,
comparing one of the respective first sets of output
values with the third set of output values to verify
they match; and
comparing the second set of output values with the
third set of output values to verify they match; and
when there is not a match, reporting detected errors for the
second accelerator or XPU.

10. The method of claim 1, further comprising at least one
of generating and displaying test output results using a
Graphical User Interface (GUI), a text file, a set of descrip-
tive error codes, JSON (JavaScript Object Notation) or
YAML (Yet Another Markup Language) files.

11. A compute platform, comprising:
a processor, including a plurality of central processing
unit (CPU) cores, coupled to memory;
test management software, comprising first instructions
configured to be executed on at least one of the plurality
of CPU cores;
test algorithm software, comprising second instructions
configured to be executed on the plurality of CPU
cores;
wherein execution of the test management software on at
least on CPU core enables the compute platform to:
for one or more test runs,
for each of multiple CPU cores among the plurality of
CPU cores,
execute a respective instance of the test algorithm
software on the CPU core to calculate output
values over a set of input test data;
compare the output values of the respective instances of
the test algorithm software across two or more CPU
cores to verify the output values match; and
when it is detected there is not a match, report detected
errors based on comparison of the output values.

12. The compute platform of claim 11, wherein the
compute platform is configured to be operated in a data center environment and further includes workload software, comprising third instructions configured to be executed on the plurality of CPU cores to perform one or more tasks associated with a workload, and wherein execution of the test management software further enables the compute platform to:

while executing the workload software on a first portion of the plurality of CPU cores, identify multiple unused CPU cores among the plurality of CPU cores that are not being used to execute the workload;

execute, in parallel, respective instances of the test algorithm software on each CPU core in at least one set of the unused CPU cores among the multiple unused CPU cores;

compare output values of the respective instances of the test algorithm software to verify they match; and detect they do not a match, report detected errors including an identity of a CPU core producing output values that do not match the output value of at least one other CPU core.

13. The compute platform of claim 11, wherein execution of the test management software further enables the compute platform to:

perform testing of the test algorithm software over a plurality of sets of unused CPU cores, wherein each set of unused CPU cores comprises a different combination of unused CPU cores, and wherein for a test over a given set of unused CPU cores execution of the test algorithm software on the CPU cores in the given set of unused CPU cores is performed in parallel.

14. The compute platform of claim 13, wherein execution of the test management software further enables the compute platform to:

employ a first set of workload CPU cores to execute the workload while concurrently performing first hardware resource testing on a first set of unused CPU cores that are not among the first set of workload CPU cores;

following the first hardware resource testing, migrate execution of the workload from at least one workload CPU core in the first set of workload CPU cores to at least one unused CPU core among the second set of unused CPU cores to establish a second configuration comprising a second set of workload CPU cores and a second set of unused CPU cores; and employ the second set of workload CPU cores to execute the workload while concurrently performing second hardware resource testing on the second set of unused CPU cores.

15. The compute platform of claim 11, wherein the platform includes one or more accelerators or Other Processing Units (XPUs) configured to implement one or more algorithms using embedded logic, and wherein execution of the test management software further enables the compute platform to:

execute a first instance of the test algorithm software to implement a first algorithm over a first set of input test data on one of the plurality of CPU cores to output a first set of output values;

implement a second instance of the first algorithm over the first set of input test data on an accelerator or XPU to output a second set of output values;

compare the first and second set of output values to verify they match; and when there is not a match, report detected errors for the accelerator or XPU.

16. A non-transitory machine-readable medium having instructions stored thereon comprising test management software and test algorithm software configured to be implemented on a compute platform including a processor having a plurality of central processing unit (CPU) cores, wherein execution of the instructions on one or more CPU cores enables the compute platform to:

for one or more test runs, for each of multiple CPU cores among the plurality of CPU cores, execute a respective instance of the test algorithm software on the CPU core to calculate output values over a set of input test data;

compare the output values of the respective instances of the test algorithm software across two or more CPU cores to verify the output values match; and when it is detect there is not a match, report detected errors based on comparison of the output values.

17. The non-transitory machine-readable medium of claim 16, wherein the compute platform is configured to be operated in a data center environment and further includes workload software configured to be executed on the plurality of CPU cores to perform one or more tasks associated with a workload, and wherein execution of instructions further enables the compute platform to:

while executing the workload software on a first portion of the plurality of CPU cores, identify multiple unused CPU cores among the plurality of CPU cores that are not being used to execute the workload;

execute, in parallel, respective instances of the test algorithm software on each CPU core in at least one set of the unused CPU cores among the multiple unused CPU cores;

compare output values of the respective instances of the test algorithm software to verify they match; and detect they do not match and report detected errors including an identity of a CPU core producing output values that do not match the output value of at least one other CPU core.

18. The non-transitory machine-readable medium of claim 16, wherein execution of the instructions further enables the compute platform to:

perform testing of the test algorithm software over a plurality of sets of unused CPU cores, wherein each set of unused CPU cores comprises a different combination of unused CPU cores, and wherein for a test over a given set of unused CPU cores execution of the test algorithm software on the CPU cores in the given set of unused CPU cores is performed in parallel.

19. The non-transitory machine-readable medium of claim 18, wherein execution of the instructions further enables the compute platform to:

employ a first set of workload CPU cores to execute the workload while concurrently performing first hardware resource testing on a first set of unused CPU cores that are not among the first set of workload CPU cores;

following the first hardware resource testing, migrate execution of the workload from at least one workload CPU core in the first set of workload CPU cores to at least one unused CPU core among the second set of unused CPU cores to establish a second configuration comprising a second set of workload CPU cores and a second set of unused CPU cores; and employ the second set of workload CPU cores to execute the workload while concurrently performing second hardware resource testing on the second set of unused CPU cores.

20. The compute platform of claim 11, wherein the platform includes one or more accelerators or Other Processing Units (XPUs) configured to implement one or more algorithms in hardware, and wherein execution of the instructions further enables the compute platform to:

execute a first instance of the test algorithm software to implement a first algorithm over a first set of input test data on one of the plurality of CPU cores to output a first set of output values;

concurrently, implement a second instance of the first algorithm over the first set of input test data on an accelerator or XPU to output a second set of output values;

compare the first and second set of output values to verify they do not match; and report detected errors for the accelerator or XPU.

* * * * *